United States Patent [19]

Windley

[11] Patent Number: 5,468,554
[45] Date of Patent: Nov. 21, 1995

[54] DYED ANTISTAIN NYLON WITH CATIONIC DYE MODIFIER

[75] Inventor: William T. Windley, Seaford, Del.

[73] Assignee: E. I. Du Pont de Nemours and Company, Wilmington, Del.

[21] Appl. No.: 260,163

[22] Filed: Jun. 15, 1994

Related U.S. Application Data

[60] Continuation of Ser. No. 960,521, Oct. 13, 1992, abandoned, which is a division of Ser. No. 564,687, Aug. 8, 1990, Pat. No. 5,164,261.

[51] Int. Cl.$^6$ .......................... B32B 27/02; C08G 69/26
[52] U.S. Cl. .......................... 428/357; 428/352; 528/347; 528/349; 524/606
[58] Field of Search ......................... 528/339, 347; 524/606; 428/357, 352

[56] References Cited

U.S. PATENT DOCUMENTS

| | | |
|---|---|---|
| 3,039,990 | 6/1962 | Huffman . |
| 3,142,662 | 7/1964 | Huffman . |
| 3,184,436 | 5/1965 | Magat et al. . |
| 3,389,549 | 6/1968 | David . |
| 3,440,226 | 4/1969 | Crovatt et al. . |
| 3,454,535 | 7/1969 | Bodensheim et al. . |
| 3,542,743 | 11/1970 | Flamand . |
| 3,640,942 | 2/1972 | Crampsey . |
| 3,755,255 | 8/1973 | Lodge . |
| 3,764,585 | 10/1973 | Siclari et al. . |
| 3,846,507 | 12/1974 | Thomm et al. ........................... 260/857 |
| 3,853,823 | 12/1974 | Cleary . |
| 3,865,900 | 2/1975 | DeCaprio et al. . |
| 3,923,749 | 12/1975 | Howell . |
| 3,931,118 | 1/1976 | Cleary . |
| 3,951,923 | 4/1976 | Cleary . |
| 3,957,734 | 5/1976 | Radlmann et al. . |
| 4,043,749 | 8/1977 | Huffman . |
| 4,083,893 | 4/1978 | Lofquist et al. . |
| 4,097,546 | 6/1978 | Lofquist et al. . |
| 4,166,080 | 8/1979 | Franks et al. . |
| 4,391,968 | 7/1983 | Merani et al. . |
| 4,579,762 | 4/1986 | Ucci . |
| 4,780,099 | 10/1988 | Greschler et al. . |
| 5,085,667 | 2/1992 | Jenkins ........................... 8/539 |

FOREIGN PATENT DOCUMENTS

| | | |
|---|---|---|
| 0373655 | 6/1990 | European Pat. Off. . |
| 24552 | 7/1978 | Japan . |
| 8533 | 3/1980 | Japan . |
| 123485 | 9/1981 | Japan . |
| 1223908 | 9/1989 | Japan . |
| 1150389 | 4/1969 | United Kingdom . |
| 1285489 | 8/1972 | United Kingdom . |
| 1478221 | 6/1977 | United Kingdom . |

*Primary Examiner*—Patrick J. Ryan
*Assistant Examiner*—Richard Weisberger

[57] ABSTRACT

Shaped articles, such as fibers, formed of a polyamide formed by salt-blending the polyamide precursor salt with a cationic dye modifier, such as the dimethyl ester of 5-sulfoisophthalic acid, followed by polymerization, are rendered resistant to staining by acid dyes at ambient conditions either by adding an acid dye to the polymer melt or by dyeing with an acid dye from an acid dyebath at pH 2 to 7 and 60° to 100° C. so that the shaped article contains from at least 0.0048 and preferably at least 0.0096 wt % of an acid dyestuff. In a preferred aspect of the invention, the shaped articles are oriented, crimped, heat-set fibers for use as the facing in carpets.

10 Claims, No Drawings

DYED ANTISTAIN NYLON WITH CATIONIC DYE MODIFIER

This is a continuation of application Ser. No. 07/960,521 filed Oct. 13, 1992, now abandonded, which is division of application Ser. No. 07/564,687 filed Aug. 8, 1990, now U.S. Pat. No. 5,164,261.

BACKGROUND OF THE INVENTION

1. Field of the Invention

The present invention relates to polyamide compositions useful in the manufacture of stain-resistant structures. More specifically, the polyamide compositions comprise modified homopolyamides and copolyamides which are prepared by salt-blending a base polyamide precursor salt with a cationic dye modifier and dyeing the resulting polymer with an acid dyestuff to a level of about 0.0048% or greater dyestuff concentration by weight. Fiber-forming and moldable polyamides including nylon, 6,6, nylon 6, and nylon 6,6/6 copolymers are especially suitable base polymers for use in the present invention. The dyed polymers of the present invention are particularly useful in the manufacture of stain-resistant fibers and yarns for use in woven, knitted, or tufted textile materials as well as injection-molded products.

2. Prior Art

Polyamide textile materials which resist dyeing by acid dyestuffs are well-known in the art. Polyamide substrates may be rendered stain-resistant by treatment with a dye-resist agent, also referred to herein and in the prior art as a stain-resist agent, such as a sulfonated phenol- or sulfonated naphtol-formaldehyde condensation product. Such dye-resist agents have been applied to the fibers comprising the article as a coating from a spin finish; or the substrate in the form of a yarn or woven, knitted, or tufted fabric has been treated in a process wherein the stain-resist composition is applied via immersion, padding, spraying, or other application means in either a batch or continuous process. Such processes are useful for the production of woven, knitted, or tufted polyamide substrates which resist staining by various acid-dye colorants, such as those often present in foodstuffs. Because the aforementioned processes involve treatment of the fiber surface, these materials suffer from the disadvantage that the stain resistance tends to deteriorate with wear. Such processes also are not effective in the manufacture of cut-pile carpets in which the pile comprises hollow-filament or cellular polyamide yarns, because the surface treatment does not sufficiently protect the interior voids of the filament and tip-staining occurs as the solution is taken up by the filament voids via capillary action.

Japanese Patent Application Publication 1-223908, published Sep. 7, 1989, discloses stain-resistant polyamides based on nylon 6, nylon 6,6, nylon 4, nylon 7, nylon 11, nylon 6,10, etc., which contain a sulfonate-containing aromatic compound of the general formula

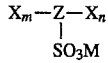

where X is any of COOH, RCOOH, COOR', RCOOR', and $RNH_2$ (R is a $C_{1-5}$ alkylene group; R' is a $C_{1-5}$ alkyl group); Z is an aromatic group; m and n are 1 or 2; M is hydrogen, an alkali metal or an ammonium group. Preferably the sulfonate group content is in the range of 0.1–5.0 mole % of the polyamide constituting units, with a terminal amino group content being not more than 10 eq/T.

It is known from Flamand U.S. Pat. No. 3,542,743, Crampsey, U.S. Pat. No. 3,640,942, Crovatt & Huffman, U.S. Pat. No. 3,440,226, and Ucci, U.S. Pat. No. 4,579,762 that polyamide materials may also be rendered resistant to staining by acid dyestuffs by copolymerizing the nylon with cationic dye modifiers such as aromatic sulfonates.

SUMMARY OF THE INVENTION

It has now been found that the stain resistance of textiles, such as carpets, as well as molded products produced from certain polyamides which have been modified during preparation by salt-blending the polyamide precursor salt with a cationic dye modifier, such as 5-sulfoisophthalic acid or salts or other derivatives thereof may be surprisingly improved by acid-dyeing the polymer or yarn at dyestuff concentrations of only about 0.0048%, and preferably about 0.0096%, or greater by weight. The modified polymer should contain 1–4 wt %, and preferably 1–2 wt %, of the cationic dye modifier. Carpets produced from yarns or fibers with less than about 0.0096% dyestuff concentration by weight in fiber are visibly and permanently stained when left in contact with a solution containing typical acid dyes used as colorants for foodstuffs, e.g. FD&C Red Dye No. 40, for a period of several hours.

DESCRIPTION

The final properties of carpets comprised of yarns of the current invention are a function of the chemical nature of the original polymers and the dye concentration in the fiber or other product. The acid-dyed polymers of the current invention have greater stain resistance than undyed cationically-modified polyamides. The stain resistance of carpets comprised of the dyed fibers of the current invention are also improved in terms of wear-durability versus unmodified polyamides which have been coated with a stain-resist agent. Fibers formed from these modified polyamides are acid-dyeable at low pH (2–7) and elevated temperature (60°–100 degrees C.).

The polyamides useful in the present invention are prepared by salt blending the base polyamide precursor salt with from 1–4 wt % of the cationic dye modifier followed by polymerization. The salt (base polyamide precursor) for 6,6 nylon is

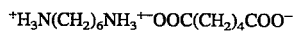

The salt (base polyamide precursor) for 6 nylon is ε-caprolactam.

The cationic dye modifiers used to form the polymers useful in the present invention have the formula

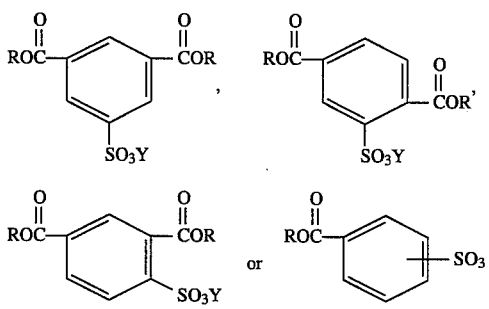

where Y is H, Li, Na, K or Cs and R is H or an alkyl group containing 1 to 5 carbon atoms. The —OR groups are lost during polymerization. The preferred cationic dye modifiers are those containing two carboxyl groups with 5-sulfoisophthalic acid being especially preferred. Generally, sufficient cationic dye modifier is used to produce a modified polymer containing from 1–4 wt % of cationic dye modifier, with from 1–2 wt % being the preferred range.

The polyamides useful in the present invention can be prepared by blending the salt of the base polyamide with the cationic dye modifier followed by polymerizing the blended composition in an autoclave using standard polymerization procedures, solidifying and fragmenting the polymer, increasing the degree of polymerization by further polymerizing the polymer in the solid phase while simultaneously super-drying the polymer, and further polymerizing the polymer in the molten state. In a preferred embodiment used for production of carpet fibers, the polymer is prepared by polymerizing nylon 6,6 salt containing sulfonate modifier salt in an autoclave to a relative viscosity of about 35, increasing the relative viscosity to about 45 to 65 by solid-state polymerization while super-drying the polymer, and melting the polymer in a screw extruder, transfer line and spin block wherein the relative viscosity is about 45 to 70. In the production of textile fibers, the acceptable relative viscosity can be lower (35–45), while in the production of industrial fibers, the acceptable relative viscosity may be 80–100. Generally, the relative viscosity of the polyamide is from 35 to 100 (over a range of textile, industrial and carpet products).

Typically acid dyes of the type used to dye nylon are sold commercially in formulations containing impurities from the dyestuff manufacturing process, fillers, and other additives in addition to the dyestuff itself. In fact, commercial acid dye formulations described as being "100%" actually contain only about 30% of the actual dyestuff. Those described as being "200%" actually contain only about 60% of the dyestuff, with those described as being "250%" having about 75% of the actual dyestuff. To account for this variation in the concentration of dyestuff, references to the amount of acid dye used in the products of this invention are to the acid dyestuff itself rather than to the amount of the commercially-available formulation. Unless the context suggests otherwise, the term "dyestuff" as used herein refers to the acid dyestuff alone, i.e. without the impurities and other additives, while the term "dye" refers to a commercially available formulation (or to a combination of such products) containing the dyestuff(s) and the other additives.

The acid dye can be applied to the polymer from an aqueous bath at high or low concentration, from a dye paste, or directly into the polymer melt by blending a color concentrate flake containing the dye, or by injecting the dye solution into the transfer line. In a preferred embodiment, the dye is applied from an aqueous bath containing from 0.01 wt % to 0.2 wt % dye, at a pH of 2 to 7, and a temperature of 60° to 100° C., with from 80° to 100° C. and a pH of 2 to 5 being the preferred ranges. The initial pH of the dyebath can be from 7 to 10, but the final pH of the dyebath should be from 2 to 7 and preferably 2 to 5 in order to exhaust the dyestuff from the bath onto the polymer. The dye should be applied to the polymer in a sufficient amount so that the dyestuff exhausts to a level greater than 0.0048 wt % dye based on polymer and preferably greater than 0.0096 wt % based on polymer. Below 0.0096 wt % dyestuff based on polymer, and especially below 0.0048 wt % dyestuff based on polymer, the resulting product does not exhibit the desired level of stain resistance.

Preferably, the polymer used in the present invention contains from 20 to 40 amine ends per $10^6$ grams of copolyamide. Polymers having fewer than about 18 amine ends per $10^6$ grams of copolyamide typically cannot be spun into fibers at commercial throughput rates due to low relative viscosities.

Generally, the polymer being dyed is in the form of a shaped article, which may be either a fiber or molded product. In a preferred aspect of the invention, the shaped article is in the form of a fiber. As used herein, the term "fiber" includes fibers of extreme or indefinite length (i.e., filaments) and short length (i.e., staple). The term "yarn" as used herein means a continuous strand of fibers. The fibers used in the present invention generally will have been oriented such as by stretching at a temperature of from ambient to 200° C. from 2.5 to 6× the original length of the unoriented fiber. Normally the fibers used in the present invention are crimped by means of a stuffing box, jet screen, hot air, steam jet, or gear crimper, or may have helical self-crimp resulting from assymetric cooling, as described in U.S. Pat. No. 4,301,102. The oriented and optionally crimped fibers when used for carpets can be direct tufted into loop or cut-pile carpets or twisted and heat-set prior to tufting. This is done by heating the fibers in steam at from 125° to 140° C. or in dry heat at from 185° to 215° while the yarns are under relaxed conditions.

STAIN TEST METHOD

The following test procedure was used to determine the stain-resist performance of textile and carpet examples of this invention:

A solution of staining agent is prepared by dissolving 45 grams of cherry-flavored, sugar-sweetened "Kool-Aid" pre-mix powder in 500 cc of water, and it is allowed to reach room temperature, i.e., 75° F. (±5° F.) or 24° C. (±3° C.), before using.

A specimen, approximately 1.5 in×3 in (3.8×7.6 cm) for carpet samples and approximately 2 in×4 in (5.1×10.2 cm) for flattened knitted textile tubes, is cut from each sample and placed on a flat, non-absorbant surface. 20 cc (10 cc used for textile samples) of the staining agent is poured onto each specimen through a cylinder to form a 1 to 2 inch (2.5 to 5.1 cm) circular stain. The cylinder is removed and the solution is worked into the fabric or carpet to achieve uniform staining. The samples are then lagged in the laboratory for twenty-four hours and then rinsed thoroughly with cool tap water and squeezed dry, using an extractor to remove excess solution.

The stain resistance of the specimen is determined visually according to the amount of color left on the stained area of the carpet or fabric. Examples that are dyed to a very light beige color are rated according to the Stain Rating Scale (a copy of which is currently used by and available from the Flooring Systems Division of E. I. du Pont de Nemours and Company, Wilmington, Del. 19898). Carpets and fabrics that are dyed to deeper color shades are rated similarly but without the rating scale. These stains can be categorized according to the following standards:

5=no staining
4=slight staining
3=moderate staining
2=considerable staining
1=heavy staining.

In other words, a stain-rating of 5 is excellent, showing good stain resistance, whereas 1 is a poor rating, showing persistence of heavy staining. For a substrate to be considered to have adequate stain resistance, it should have a rating of at least 4 on the above-described Stain Rating Scale.

EXAMPLES 1–3

Textile yarn samples were produced in a manner known in the trade by polymerizing and spinning a salt blend of nylon 6,6 and the sodium salt of the dimethyl ester of 5-sulfoisophthalic acid. The copolymer so-formed contained about 98 wt % nylon 6,6 and about 2 wt % of the cationic dye-modifier as determined by sulfur analysis. The copolymer had a relative viscosity of 33.5 as produced and was dried in an oven for 16 hours at 105° C. under a vacuum of about 10 kN/m$^2$. The relative viscosity for this and the other examples herein was determined by measuring the flow time in seconds using a standard viscometer of a solution of 0.5 g of the polymer in 100 ml of hexafluoroisopropanol at 25° C (±10° C.) and dividing by the flow time in seconds for the pure solvent.

The copolymer in flake form was supplied to a Type 402 twin screw extruder manufactured by Werner-Pfleiderer Corporation, 663 East Crescent Ave., Ramsey, N.J. 07446. The flake was extruder-melted with the temperature increasing as the polymer progressed through the extruder from 235° to 277° C. The temperature was then held constant at approximately 279° C. as the polymer passed through the transfer line, spin-pump, block and spin pack. The residence time from the extruder feed zone to the spinneret was approximately 10.5 minutes. The polymer was spun at 1.9 g/min/capillary into 17 filaments having a round cross-section. The filaments were air quenched and passed over a primary finish roll to a feed roll operating at a surface speed of 300 m/min. The spun filaments were drawn at ambient temperature to 19 denier per filament (21 dtex) by rolls at a speed of 900 m/min and then wound onto a tube at a speed of 860 m/min. The 320 denier yarns were knitted into circular tubes, a portion of which for Example 1 were individually scoured by boiling for 20 minutes in an aqueous bath containing 1 g/l of sodium perborate, 0.25 g/l Jell Igipon T-51 anionic surfactant which is a sulfo-amide derived from N-methyltaurine or N-cyclohexyltaurine and fatty acids used as a scouring agent for removing finish oils (produced by GAF Chemical Company, 1361 Alps Road, Wayne, N.J. 07470), and then rinsed 5 times. Fabric of Example 1 was dyed in a dye bath containing 0.2% based on weight of fabric with Telon Blue 2GL (200%) Acid Blue C.I. No. 40, i.e. 0.12% dyestuff, at a liquor ratio of 40:1 in a simulated laboratory beck process. The dye bath containing the fabric was heated over a period of one hour to the boil and held at the boil for one hour. The solution pH was maintained at 7 during dyeing. After the one hour boil, the pH was reduced to about pH 2.0 to completely exhaust the dye producing a deep blue shade in all of the samples. Fabric of Example 2 was dyed a light beige shade in a simulated laboratory beck dyeing process using 0.014% dye (0.008% Tactilon Yellow 4R (250%) Acid Yellow C.I. No. 219, 0.004% Tactilon Red 2B (200%) Acid Red C.I. No. 361, 0.002% Nylanthrene Blue BAR (200%)), based on weight of fabric and a liquor ratio of 30:1. (This combination of dyes represents a dyestuff level of 0.0096%, i.e. (0.008×0.75)+ (0.004×0.6)+(0.002×0.6).) The samples were not scoured prior to dyeing because the scouring step described above in Example 1 was found to degrade the stain-resist performance of light-dyed samples. The samples were first wet-out in a room temperature bath at a pH of 8 for 15 minutes. The fabric was placed in the bath and heated to the boil over a period of one hour followed by boiling 1 hour with stirring.

The pH was then reduced to 7 in order to completely exhaust the dye. Fabric of Example 3 was dyed similarly to Example 2 except that 0.007% dye concentration by weight of fabric was used. Fabric of Control A was similar to Examples 1–3 but was undyed. Dyed and undyed tubular samples were tested for stain resistance according to the stain-test procedure described above. Results are summarized in Table I.

TABLE I

| EXAMPLE NUMBER | DYE COLOR | DYESTUFF WT % | STAIN RATING |
| --- | --- | --- | --- |
| 1 | DEEP BLUE | 0.12 | 5 |
| 2 | LT. BEIGE | 0.0096 | 5 |
| 3 | LT. BEIGE | 0.0048 | 3 |
| CONTROL A | UNDYED | 0.000 | 2 |

EXAMPLES 4 and 5

Carpet yarn samples were produced in a manner known in the trade by polymerizing and spinning a salt blend of nylon 6,6 and the sodium salt of the dimethyl ester of 5-sulfoisophthalic acid. The copolymer so-formed contained about 98 wt % nylon 6,6 and about 2 wt % of the cationic dye-modifier as determined by sulfur analysis. The copolymer had a relative viscosity of 36 as produced and was dried in an oven for 16 hours at 105° C. under a vacuum of about 10 kN/m$^2$. The copolymer was then melted in a twin screw extruder with temperature increasing as the polymer progressed through the extruder to a maximum of 290° C. The copolymer was further mixed with Kenics type static mixers in the transfer line. The residence time at melt temperature was approximately 10.5 min. The polymer was spun into 128 4-void hollow filaments at 380 g/min. The filaments were air quenched and passed over a primary finish roll to a feed roll operating at a surface speed of 581 m/min. The spun filaments were drawn by hot rolls at a temperature of 200° C. and a speed of 1657 m/min to yield a yarn of 1225 denier (1347.5 dtex). The drawn filaments were jet bulked with hot air at 105 psig and 220° C. onto a bulking drum screen having a drum speed of 60 rpm (surface speed of 72.1 meters/min.) where they were relaxed prior to being removed by a take-up roll at 1391 m/min. The bulked yarn was then wound onto tubes at a speed of 1479 m/min. A portion of the yarn was twisted 4.5×4.5 turns per inch and Suessen heatset at a temperature of 205° C. prior to tufting into ¹⁄₁₀ inch gauge (39.37 tufts/dm), ⅜ inch (9.53 mm) pile height, 38 oz/yd$^2$ (1288.3 g/m$^2$) cut-pile carpets. The bulked unheatset yarns were direct tufted into loop pile carpet samples of ¹⁄₁₀ inch gauge (39.37 tufts/dm), ¼ inch (6.35 mm) pile height, having a weight of 14.5 oz/yd$^2$ (491.6 g/m$^2$). A portion of each carpet sample was pot-dyed in a dyebath containing 0.1% by weight of fiber of Anthraquinone Milling Blue B (100%) Acid Blue C.I. No. 122, i.e. 0.03 wt % dyestuff. The dye liquor was adjusted to a pH of 4.5, heated to 90° C., and the carpet immersed in the hot dye bath for 10 minutes while maintaining the temperature at 90° C., rinsed, and dried in an oven at 125° C. The dyed and undyed carpet samples were tested for stain resistance according to the Stain Test procedure described above. Results are summarized in Table II.

TABLE II

| EXAMPLE NO. | TWISTSET CONDITIONS | DYED/ UNDYED | STAIN RATING |
| --- | --- | --- | --- |
| EXAMPLE 4 | SUESSEN | DYED | 5 |
| EXAMPLE 5 | NONE | DYED | 5 |
| CONTROL B | SUESSEN | UNDYED | 2 |
| CONTROL C | NONE | UNDYED | 3 |

EXAMPLES 6 AND 7

Yarn samples comprised of a copolymer made by salt-blending nylon 6,6 and the sodium salt of the dimethyl ester of 5-sulfoisophthalic acid (DSA) were prepared by combining nylon 6,6 salt with a solution of the sodium salt of the dimethyl ester of 5-sulfoisophthalic acid in a steam heated autoclave. The salt blend was polymerized in a standard conventional nylon cycle and the resulting polymer was discharged as a ribbon and cut into flake chips of about 0.073 cm$^2$. The copolymer, which had a relative viscosity of 33.5 as produced, was then dried under a vacuum of 28 inches (0.71 m) water until it reached a temperature of 105° C., and was then dried at 1–2mm mercury for 6 hours prior to spinning.

The filaments used in EXAMPLES 6 and 7 and Control D were extruded in the conventional manner from the copolymer produced as described above. Using sulfur analysis it was determined that the copolymer contained about 98 wt % nylon 6,6 and about 2 wt % of the cationic dye modifier. The filaments used in Control E were similarly extruded but the polymer was polyhexamethylene adipamide homopolymer. In EXAMPLES 6 and 7 and Control E, the polymer in flake form was blended with the dry acid dye reported in TABLE III. The dye-blended flake (or plain flake in Control D) was charged to a Werner-Pfleiderer Model 402 twin screw extruder and extruded with the temperature increasing as the polymer progressed through the extruder with 217° C. at Zone 1, 267° C. at Zone 2, and 272° C. at Zones 3 and 4, transfer line, meter-pump block, and spinneret. The residence time from the extruder feed-zone to the spinneret was approximately 10.5 minutes. The polymer was spun at 1.87 grams/minute/capillary through capillaries of 0.0228 mm diameter by 0.304 mm length into 17 filaments having a round cross-section. The filaments were air quenched and passed over a primary finish roll to a feed roll operating at a surface speed of 300 m/min. The spun filaments were drawn 3×at ambient temperature to 18.82 denlet per filament (18.8 dtex) by unheated rolls at a surface speed of 900 m/min and then relaxed on hot chest rolls at a surface temperature of 120° C. operating at a surface speed of 875 m/min. The resulting 320 denier yarn was then wound onto a tube at 885 meters/minute.

The 320 denier yarns were knitted into circular tubes, a portion of which were directly tested for stain-resistance according to the stain test procedure described above. Results are described in TABLE III. EXAMPLE 6 produced from the 98/2 wt % copolymer described above with 0.01 wt % Anthraquinone Brilliant Blue B, (100%) Acid Blue C.I. No. 45 (ABB), i.e. 0.003 wt % dyestuff, had a stain rating of 4.0. EXAMPLE 7, produced similarly to EXAMPLE 6 except that the dye concentration was 0.05 wt % (0.015 wt % dyestuff), had a stain rating of 5.0. Control D, produced similarly to EXAMPLES 6 and 7 except that there was no dye combined with the polymers, had a stain rating of 1.0. Control E was produced similarly to EXAMPLES 5 and 6 except that the polymer was 100% 6,6 nylon, the spun throughput was 1.98 grams/minute/capillary, the denier per filament was 20.0, the cross-sectional shape of the yarn was four void hollow-filament, and the acid dye was 0.44 wt % Telon Blue 2GL (200%) Acid Blue C.I. No. 40 (TB2), i.e. 0.264 wt % dyestuff. Control E had a stain rating of 1.0.

TABLE III

| Example | Stain Rating | Polymer Type | Dye Type | % Dye in Polymer |
| --- | --- | --- | --- | --- |
| D | 1 | 6,6-DSA | — | 0 |
| 6 | 4 | 6,6-DSA | ABB | 0.01 |
| 7 | 5 | 6,6-DSA | ABB | 0.05 |
| E | 1 | 6,6 | TB2 | 0.44 |

I claim:

1. A shaped article having a stain-resistance rating of at least 4 the Stain Rating Scale of the Stain Test Method with respect to acid dyes formed of a modified polyamide which is polyhexamethylene adipamide or a copolymer of hexamethylene diamine, adipic acid and ε-scaprolactam which contains from 1 to 4 weight percent based on final modified polymer weight of a cationic dye modifier of the formula

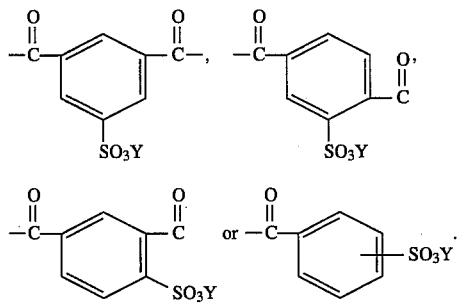

where Y is H, Li, Na, K or Cs, and which contains at least 0.0048 weight percent of an acid dyestuff based on modified polymer weight.

2. The shaped article of claim 1 wherein from 1 to 4 weight percent of units of the formula

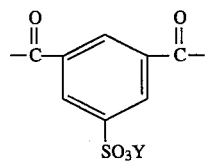

are present in the polyamide.

3. The shaped article of claim 2 which is in the form of a fiber and wherein the polyamide is polyhexamethylene adipamide.

4. The fiber of claim 3 which contains at least 0.0096 weight percent of an acid dyestuff based on modified polymer weight.

5. The fiber of claim 4 wherein the fiber is oriented by stretching from 2.5 to 6×its original length.

6. The fiber of claim 5 wherein the fiber is crimped.

7. The fiber of claim 5 wherein the fiber has been heat set in air at from 185° to 215° C.

8. The fiber of claim 6 wherein the fiber has been heat set in air at from 185° to 215° C.

9. The fiber of claim 7 wherein from 1 to 2 weight percent of the cationic dye modifier is present.

10. The fiber of claim 8 wherein from 1 to 2 weight percent of the cationic dye modifier is present.

* * * * *

UNITED STATES PATENT AND TRADEMARK OFFICE
CERTIFICATE OF CORRECTION

PATENT NO. : 5,468,554
DATED : November 21, 1995
INVENTOR(S) : William T. Windley It is certified that error appears in the above-identified patent and that said Letters Patent is hereby corrected as shown below:

Column 8:
In Claim 1, line 1, "shaped article" is hereby deleted and -- fiber -- is inserted in place thereof.

In Claim 1, line 2, "on" is hereby inserted after -- at least 4 --.

In Claim 1, line 12, ",wherein the acid dyestuff has been applied from an aqueous bath having a pH in the range of 2 to 5." is hereby inserted after -- polymer weight --.

In Claim 2, line 1, "shaped article" is hereby deleted and -- fiber -- is hereby inserted in place thereof.

In Claim 3, line 1, "shaped article of claim 2 which is in the form of a fiber" is hereby deleted and -- fiber of claim 2 -- is hereby inserted in place thereof.

Signed and Sealed this

Fourth Day of June, 1996

*Attest:*

BRUCE LEHMAN

*Attesting Officer*     *Commissioner of Patents and Trademarks*